No. 640,195. Patented Jan. 2, 1900.
J. W. HART.
ICE CREAM FREEZER.
(Application filed Mar. 28, 1898.)
(No Model.) 2 Sheets—Sheet 1.
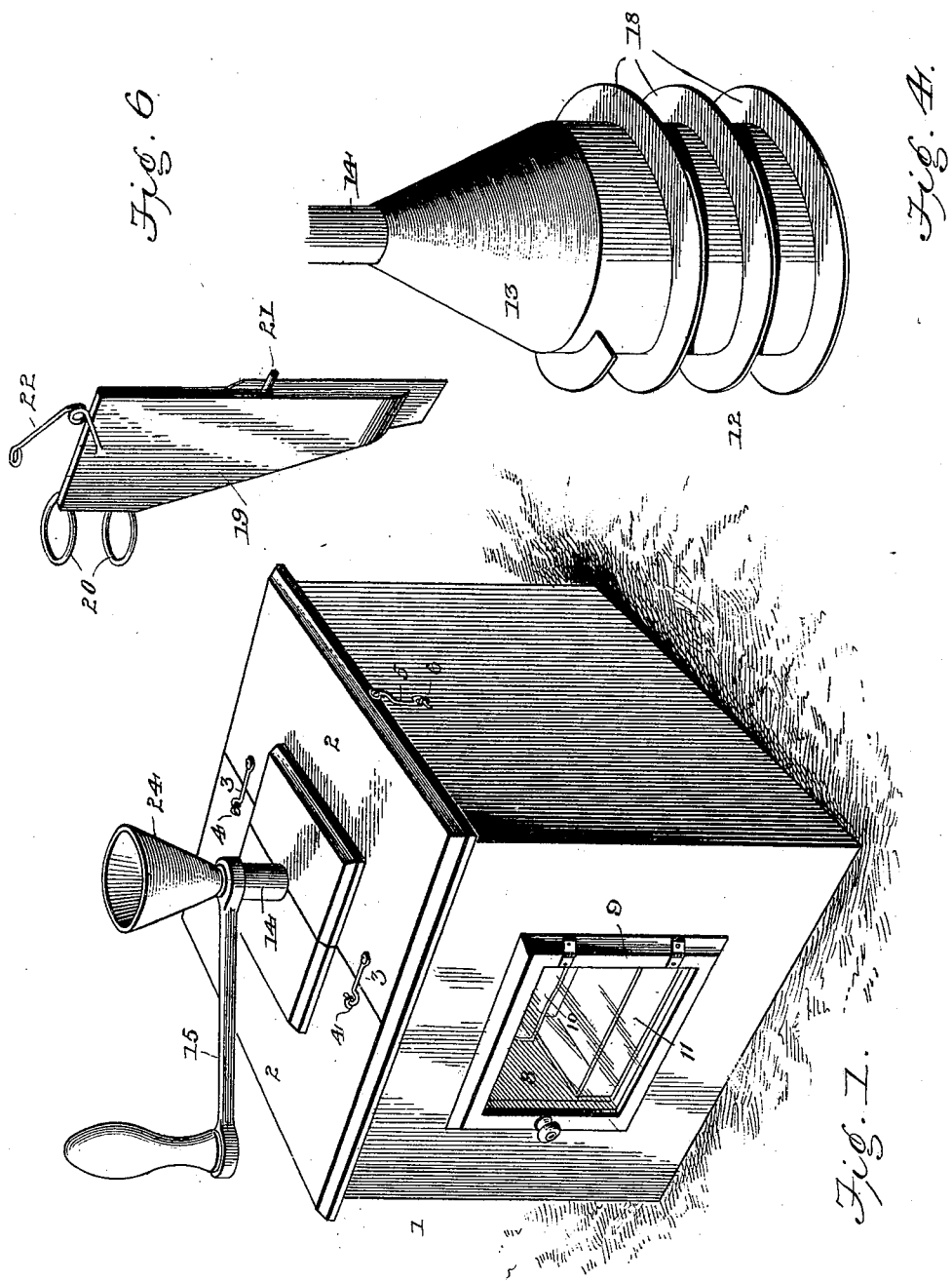
Witnesses
E. H. Monroe
U. B. Hillyard.
John W. Hart Inventor
By his Attorneys.
C. A. Snow & Co.

No. 640,195. Patented Jan. 2, 1900.
J. W. HART.
ICE CREAM FREEZER.
(Application filed Mar. 28, 1898.)
(No Model.) 2 Sheets—Sheet 2.
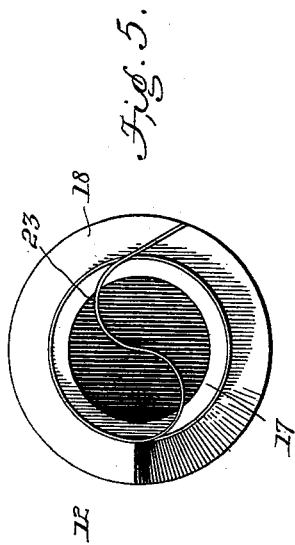
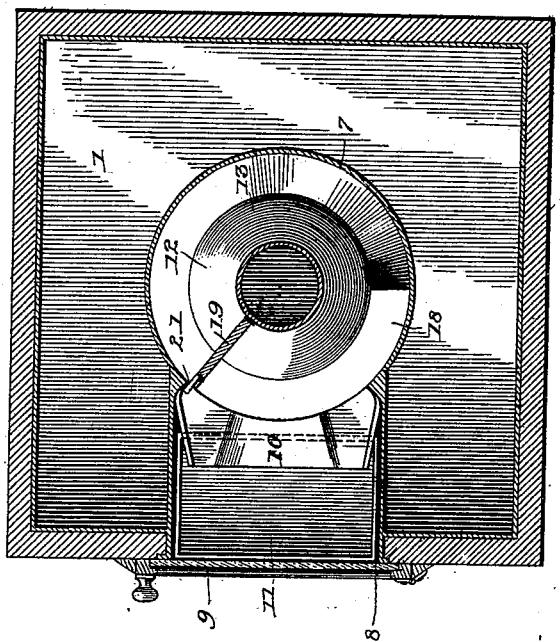
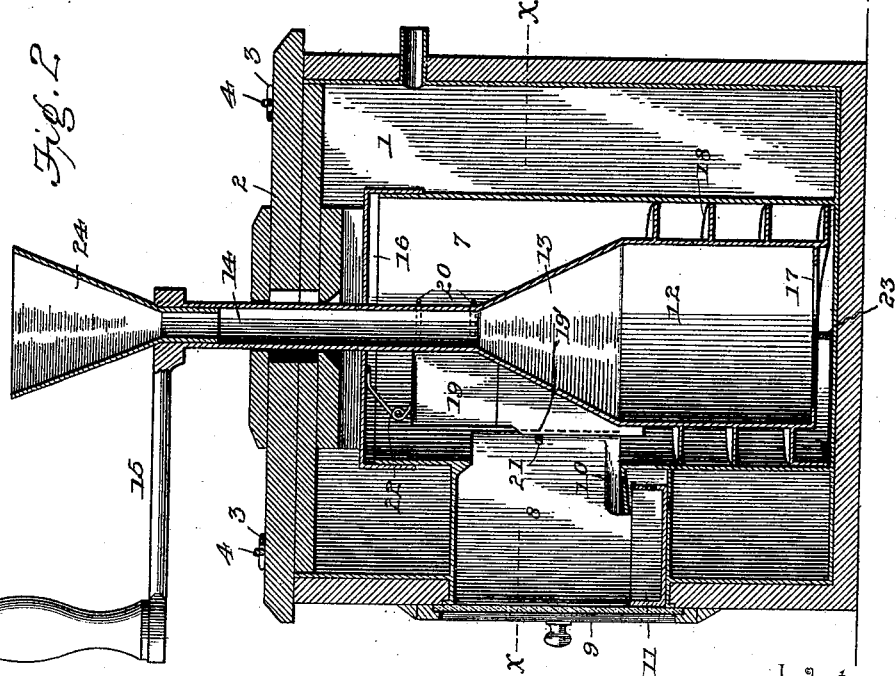
Witnesses
E. N. Monroe
V. B. Hillyard.
John W. Hart, Inventor
By his Attorneys,
C. A. Snow & Co.

United States Patent Office.

JOHN W. HART, OF IOLA, KANSAS, ASSIGNOR OF ONE-HALF TO JOHN SPOO AND WILLIAM BRADLEY, OF SAME PLACE.

ICE-CREAM FREEZER.

SPECIFICATION forming part of Letters Patent No. 640,195, dated January 2, 1900.

Application filed March 28, 1898. Serial No. 675,439. (No model.)

*To all whom it may concern:*

Be it known that I, JOHN W. HART, a citizen of the United States, residing at Iola, in the county of Allen and State of Kansas, have invented a new and useful Ice-Cream Freezer, of which the following is a specification.

This invention relates to apparatus for freezing milk, cream, custards, and like mixtures usually served in a frozen condition, and has for its object the provision of a machine which will be practically continuous in operation, the mixture to be frozen being supplied at required intervals and the frozen delicacy removed as desired.

An essential feature of the invention is simplicity of construction and a disposition of the parts so as to economize in the refrigerating agent, whereby a maximum amount of mixture can be frozen with a given quantity of refrigerant.

A further purpose of the improvement is the construction and assemblage of the parts to admit of access being readily had thereto for the purpose of cleaning without loss of time or waste of material.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a refrigerating apparatus constructed in accordance with this invention. Fig. 2 is a vertical central section thereof. Fig. 3 is a plan section of the apparatus about on the line X X of Fig. 2. Fig. 4 is a detail view in perspective of the combined agitator and elevator. Fig. 5 is a view of the agitator as seen from the inner end. Fig. 6 is a detail view of the combined scraper and deflector.

Corresponding and like parts are referred to in the following description and indicated in the several views of the drawings by the same reference characters.

The receptacle or cabinet 1 for containing the refrigerating agent may have any desired configuration, and, as illustrated, is of rectangular or box form and is lined with metal, so as to retain moisture and prevent the woodwork from injury. The cover is formed of similar parts 2, separable on a middle line and held together by hooks 3 and eyes 4 or like means. The cover is constructed so as to have the portions fit within the upper part of the receptacle and a part overlap the upper edges of the sides thereof and is held in place by suitable fastenings, such as hooks 5 and eyes 6.

A vessel 7, of cylindrical form, is located centrally within the receptacle 1 and has an opening in its side, near its upper end, for the escape of the frozen substance or mixture. A compartment 8 is located opposite the side of the vessel, having an opening formed therein, and extends through a corresponding opening in the side of the receptacle adjacent to the side of the vessel having the opening formed therein. The walls of the compartment 8 surround the corresponding openings formed in the sides of the receptacle and vessel and are of sheet metal and admit of the cold reaching the frozen substance contained in the compartment and retaining it in a frozen condition until required to be served. This compartment 8 is closed at its outer end by a glass panel or door 9, which admits of the frozen substance being under observation without permitting the escape of the cold or the entrance of the heat to melt the substance after it has been frozen. The lower edge of the opening in the side of the vessel 7 is higher than the bottom of the compartment 8, and a lip or spout 10 projects outwardly therefrom and overhangs the bottom of the compartment, so as to deliver the frozen mixture into a pan or box 11, placed in the compartment for its reception.

The agitator consists of a cylindrical body 12, having its upper end portion made conical, as shown at 13. A tubular stem 14 connects with the conical end 13 and passes through semicircular notches formed in the meeting edges of the parts 2. Suitable means are resorted to for rotating the stem 14 and the agitator connected therewith, and, as shown, a crank 15 is applied to the upper end of the stem 14 for this purpose. The vessel 7 is closed by a cover 16, which is centrally apertured for the passage therethrough of the stem 14. An inner flange 17 is provided at the lower end of the cylindrical body 12 to direct the substance or mixture to be frozen toward the center of the vessel 7. A flange 18 is arranged spirally around the cylindrical body 12 and extends from the lower to the upper end thereof and constitutes a screw elevator for lifting the substance to the compartment 8 as quickly as it is frozen. This flange in addition to elevating the frozen substance serves to scrape it from the sides of the vessel 7. The upper end of the flange 18 terminates about in the plane of the lip or spout 10, so as to raise the frozen substance to the level thereof.

A combined deflector and scraper 19 is mounted upon the lower portion of the tubular stem 14 and consists of a plate having its inner lower edge cut away at an angle corresponding to the inclination of the conical end 13, against which the inclined edge of the plate bears, so as to remove the frozen substance therefrom when the machine is in operation. This deflector is provided at its inner edge with bearings or rings 20, through which the tubular stem 14 passes loosely, thereby admitting of the agitator having an independent rotary movement. The lower outer portion 19' of the deflector overlaps and engages with the inner edge of a side wall of the compartment 8, thereby directing the frozen substance into said compartment. A pin or stop 21 projects outwardly from the deflector and engages with the side wall of the compartment 8 opposite said deflector and prevents the latter from following the rotary movements of the agitator. The lower end portion of the deflector is adapted to clear the delivery end of the flange 18, thereby insuring a removal of the frozen substance therefrom. A spring 22 is secured to the upper end of the deflector and is adapted to engage with the lower side of the cover 16 and press the deflector against the conical end 13 of the agitator, so as to insure its effective operation in removing the substance therefrom when frozen. A scraper 23, of ogee form, is applied to the lower end of the cylindrical body 12, and its purpose is to scrape the substance from the bottom of the vessel 7 and move it outward toward the sides of said vessel, so as to be taken up by the screw elevator.

In practice a refrigerating agent, such as a mixture of ice and salt, is placed in the receptacle 1, around the sides of the vessel 7 and the walls of the compartment 8. The milk, cream, or other liquid mixture to be frozen is supplied to the vessel 7 in desired quantity through the tubular stem 14, preferaby by means of a funnel 24, fitted to the upper end of said stem. The mixture entering the cylindrical body 12 passes upward into the space formed between it and the sides of the vessel 7 and coming in contact with the cold sides of said vessel is congealed or frozen and is elevated by means of the spiral conveyer. The frozen substance when it reaches the deflector 19 is directed into the compartment 8 over the lip or spout 10 and is received in the pan or box 11, and the latter when removed is replaced by another pan, so that the apparatus may be practically continuous in its operation, the mixture to be frozen and the refrigerating agent being supplied from time to time as required.

Having thus described the invention, what is claimed as new, and desired to be secured by Letters Patent, is—

1. In a refrigerating apparatus, the combination of an outer receptacle for the freezing agent, a vessel fixed within the receptacle and surrounded by such agent, a second rotary vessel within the first-named vessel having a conical portion, a scraper mounted loosely upon the last-named vessel and movable longitudinally thereof, and engaging a fixed part to prevent its rotation, and a spring adapted to press the scraper longitudinally of said vessel and along its line of engagement and into contact with the conical portion, as and for the purpose set forth.

2. In a refrigerating apparatus, the combination with a receptacle adapted to receive a freezing mixture, a vessel fixed within the receptacle, a second vessel within the first-named vessel and separated therefrom at its base and sides by interspaces, a spiral flange intermediate the sides of the vessels and extending from the bottom of the first-named vessel upwardly thereof, a spring-pressed scraper mounted loosely upon the inner vessel and movable longitudinally and rotatably of the latter and adapted to engage the inner vessel, an opening in the base of the inner vessel, and means for contributing the material to be frozen directly to the inner vessel.

3. In a refrigerating apparatus, the combination with a vessel having an opening through a side, and a rotary agitator having a tapered portion adjacent said opening, of a spring-pressed combined deflector and scraper loosely journaled upon the agitator and movable longitudinally thereof and having a stop at its outer edge constantly engaging with a side of the opening of the vessel, substantially as and for the purpose set forth.

4. In a refrigerating apparatus, the combination with a vessel having an opening in its side, and an agitator, of a combined deflector and scraper loosely journaled upon the agitator and having its outer edge portion engaging with a side of the opening of the vessel, and a spring exerting a downward pressure upon the deflector to hold the same in contact with the agitator, substantially as set forth.

5. In a refrigerating apparatus, the combination with a vessel having a side opening, and an agitator comprising a cylindrical body having an upper conical end portion, of a combined deflector and scraper comprising a plate loosely mounted upon the stem of the agitator and having its inner lower edge portion cut away to engage with the conical end portion of the body and having its outer edge portion constructed to engage with a side of the opening of the vessel, substantially as described.

6. A refrigerating apparatus comprising a receptacle for receiving the freezing agent, a vessel located within the receptacle and having a side opening, a compartment located in the space formed between the opposing sides of the receptacle and vessel, a door closing the outer end of the compartment, a lip or spout overhanging the bottom part of the compartment and in the plane of the lower edge of the opening formed in the side of the vessel, a cylindrical body having its upper end made conical and having a scraper at its lower end, and a spiral elevator at its outer side, a tubular stem connecting with the conical end of the body and providing means for supplying the mixture to be frozen to the vessel, a combined deflector and scraper loosely mounted upon the tubular stem and adapted to engage with a side wall of the compartment, and a spring applied to the upper end portion of the deflector and adapted to engage with the cover of the vessel and exert a downward pressure upon the deflector, substantially as and for the purpose set forth.

7. A refrigerating apparatus comprising an outer receptacle having an opening and adapted to receive the freezing agent, an inner cylindrical vessel having an opening communicating with the opening of the receptacle, said vessel being adapted to receive the mixture to be frozen, and a vertical hollow rotary agitator arranged concentric within the vessel, extending from the exterior of the apparatus to the said vessel and forming a conduit to enable the mixture to be frozen to be introduced into the device, said agitator being reduced at its upper and cylindric at its lower end, a spiral conveyer fast around the cylindric portion and adapted to scrape the frozen mixture from within the vessel and raise the same to the said openings, and a deflector opposite the reduced end of the agitator, engaging therewith, and directing the frozen material into said openings, substantially as described.

In testimony that I claim the foregoing as my own I have hereto affixed my signature in the presence of two witnesses.

JOHN W. HART.

Witnesses:
A. H. CAMPBELL,
PAUL GOSHORN.